Aug. 19, 1969 AKIO OHKOSHI ET AL 3,462,641

COLOR PICTURE TUBE

Filed July 28, 1966 2 Sheets-Sheet 1

INVENTORS
AKIO OHKOSHI
HIROMASA MACHIDA
YUZO FUSE

BY Hill, Sherman, Meroni, Gross & Simpson
ATTORNEYS

COLOR PICTURE TUBE

INVENTORS
AKIO OHKOSHI
HIROMASA MACHIDA
YUZO FUSE
BY Hill, Sherman, Meroni, Gross & Simpson
ATTORNEYS United States Patent Office 3,462,641

Patented Aug. 19, 1969

3,462,641
COLOR PICTURE TUBE

Akio Ohkoshi, 5–6 Akabane-kita, 1, Kita-ku; Hiromasa Machida, 16–21 Nakahara 4, Mitaka-shi; and Yuzo Fuse, 303 Kitashinagawa 3, Shinagawa-ku, all of Tokyo, Japan Filed July 28, 1966, Ser. No. 568,625
Claims priority, application Japan, July 30, 1965, 40/46,429; Aug. 4, 1965, 40/47,633
Int. Cl. H01j 29/70
U.S. Cl. 315—21 4 Claims

ABSTRACT OF THE DISCLOSURE

Color picture tube of the single gun type wherein a pair of color switching coils are connected in series and disposed on opposite sides of a deflection yoke, the coils being connected in opposed phase relation and spaced with relation to each other to effect a balance between color distortion and power consumption.

The present invention relates to a picture tube for color television, and more specifically, to a picture tube of the type in which only one electron gun is employed, the various phosphors being excited by controlled angular deflection of an electron beam.

Single gun systems for cathode ray tubes employing both the dot triads and the line phosphors have been suggested in the past, but these systems have not met with significant success. Control circuits for this type of system become quite complex and power consuming. Furthermore, such systems frequently evidenced color distortion which significantly decreased the quality of the reproduction.

One of the objects of the present invention is to provide a color television tube and associated circuitry which requires only low power consumption for the color switching function.

Another object of the invention is to provide a color television tube control circuit and a means of minimizing color distortion of the image.

Other objects, features and advantages of this invention will become apparent from the following description taken in conjunction with the accompanying drawings, in which.

As shown in the drawings.

Figures 1, 2, 3:
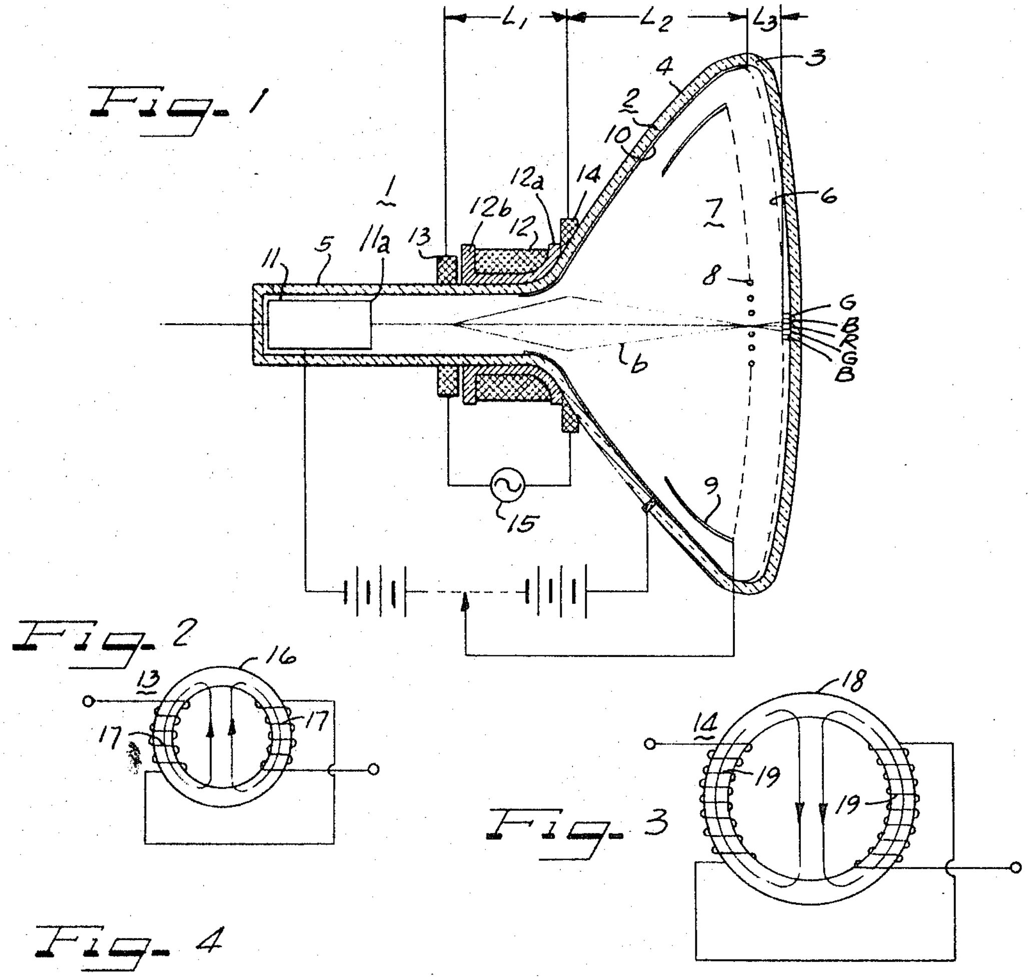
FIGURE 1 is a view in cross section of a cathode ray tube embodying the improvements of the present invention.
FIGURE 2 is a plan view of a color switching coil assembly which embraces the neck of the tube.
FIGURE 3 is a plan view of a suitable color switching coil assembly which embraces the conical portion of the tube.

In FIGURE 1, reference numeral indicates generally a color picture tube which can be employed in the present invention, the tube 1 having an envelope 2 which includes a faceplate portion 3, a conical portion 4, and a neck portion 5. A color phosphor screen 6 is deposited on the inner face of the faceplate portion 3. The color phosphor screen 6 may be composed of red, green and blue strip phosphors R, G, and B extending across the face of the tube, and sequentially arranged in a repeating cyclic order which may be, for example, red, green, blue, and red. Immediately adjacent the phosphor screen 6 is a post-acceleration grid 7 composed of fine wires 8, the wires being disposed, for example, opposite the lines of demarcation between the green and blue phosphor strips, and running parallel to the lengths of the strip phosphors. The post-acceleration grid 7 has applied thereto a potential which is lower than that applied to the phosphor screen 6. A shield 9 is provided in the tube for mounting the post-acceleration grid 7 thereon and for producing a homogeneous magnetic field. An inner conductive layer 10 is coated on the inner surface of the conical portion 4. Provided in the neck portion 5 of the envelope 2 is a single electron gun 11 of conventional design. Mounted about the neck portion 5 is a main deflection yoke 12 comprising a vertical deflection coil and a horizontal deflection coil, both being energized by suitable sweep circuits in the usual manner for color television receivers.

In accordance with the present invention, a color switching coil assembly 13 is mounted about the neck 5 of the tube rearwardly of the deflection yoke 12, and a color switching coil assembly 14 is mounted on a conical portion 4 of the tube forwardly of the deflection yoke 12. It has been found that the spacing between the various coil assemblies should be adjusted for optimum results in balancing power consumption and color resolution. Specifically, it has been found that the ratio of the distance $L_1$, which is the distance between the center of the coil assembly 13 and the center of the coil assembly 14 to the distance $L_2$, which is the distance between the center of the coil assembly 14 and the center of the post-acceleration grid 7, measured from its center, should be in the range of about 0.4 to 1.1.

The coil assemblies 13 and 14 are electrically connected in series with each other and in opposed phase relation. The color switching signal source 15 is then applied across the two serially connected coils.

As best seen in FIGURES 2 and 3, the coils 13 and 14 include cores 16 and 18 respectively. A pair of oppositely wound coil segments 17 are disposed on the core 16 in opposed relation, to provide a flux path indicated by the arrows of FIGURE 2. Similarly, opposed segmental coils 19 are wound about the core 18 as illustrated in FIGURE 3 to provide a flux path through the core in the direction of the arrows. It should be recognized that the cores shown in the drawings are purely for purposes of illustration, and that they may be annular, oval, or square in configuration.

To clarify the relationships which preferably exist in the structure of the present invention, we will give typical numerical values which can be used when the invention is applied to an 8 inch picture tube. The distance $L_1$ between the neck and the conical portion engaging coil assemblies 13 and 14 may be about 80 mm. The distance $L_2$ between the color switching coil assembly 14 and the post-acceleration grid 7 may be about 160 mm. The distance $L_3$ between the post-acceleration grid 7 and the color phosphor screen 6 may be about 15 mm. The color switching coil assembly 13 may consist of a coil 17 having 200 turns on an annular core 16, and representing an inductance of 740 microhenries, and a magnetic field intensity of twenty ampere-turns. The color switching coil assembly 14 may comprise a coil 19 wound with 270 turns on a similar annular core 18 and exhibiting an inductance of 3.4 mh., and a magnetic field intensity of 40 ampere-turns. With this arrangement, a potential of 18 to 20 kv. is applied to the color phosphor screen 6, and the inner conductive layer 10 on the inner surface of the conical portion 4, while a potential of about 5 to 6 kv. is applied to the post-acceleration grid 7 and the shield 9.

The color switching signal source 15 feeds the color switching coil assemblies 13 and with an alternating current signal of 3.58 mc. in the dot-sequential system and 5.25 kc. in the line-sequential system.

Figure 4:
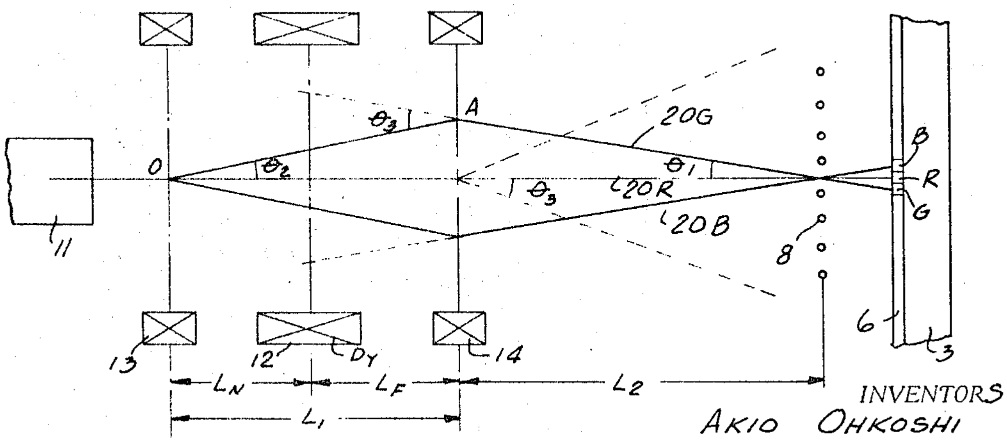
FIGURE 4 is a schematic diagram for explaining the operation of the color picture tube of the present invention.

The picture tube shown in FIGURE 1 operates in the following manner. When no current is applied to the color switching coil assemblies 13 and 14, an electron beam $b$ emitted from the electron gun 11 is deflected only by the deflection field of the deflection yoke 12 and scans over the color phosphor screen 6. In this situation, the electron beam $b$ impinges upon the screen between the wires 8 of the post-acceleration grid 7, to strike a red emitting strip phosphor R when the color switching signal current is zero. Upon application of a color switching signal current to the color switching coil devices 13 and 14, they produce magnetic fields whose directions depend upon the direction of the current. The color switching devices 13 and 14 are connected in opposed relation, so that by applying magnetic fields of suitable intensity, the electrons in the beam $b$ are first diverged by the action of the coil assembly 13, and then converged by the color switching coil 14, as illustrated in FIGURES 1 and 4. The electron beam $b$ is thus subjected to slight deflection by these two magnetic fields, and the position of impingement of the electron beam $b$ upon the screen 6 is displaced to the right or left of its normal path. The electrons will thus be impinged upon the various strip phosphors G, B, or R, depending upon the magnitude of the currents flowing in the various coil assemblies. The electron beam thus scans the red, green, and blue strip phosphors in a dot-sequential manner or in a line-sequential manner in accordance with the color switching signal applied to the color switching devices 13 and 14.

The magnetic fields produced by the color switching devices exhibit different intensities at the central portions of their cores 16 and 18 from that at the marginal portions thereof. Therefore, the amount of deflection of the electron beam $b$ by the color switching devices 13 and 14 depends upon the path of the beam within the coil assemblies 13 and 14.

In order to provide a uniform magnetic field, it is desirable to make the ratio of the radius of the core and the maximum radius of deflection of the electron beam $b$ within the coil as large as possible. In accordance with the present invention, the color switching devices are placed in such relative positions as to provide this effect. With this arrangement, the color switching device 13 located on the neck of the tube causes the electron beam to diverge prior to deflection by the deflection yoke 12, while the color switching device 14 located on the conical portion of the tube focuses and deflects the electron beam $b$ which has been deflected by the deflection yoke 12 but has not yet been fully displaced from the tube axis. As a result, the deflection of the electron beam $b$ by the two switching devices is accomplished along the tube axis, or in the vicinity thereof, and the electron beam is always deflected in such a region that uniform magnetic fields are produced by the color switching devices 13 and 14. Consequently, the electron beam is uniformly subjected to slight deflection by the color switching devices 13 and 14 independently of the position of its path, so that color distortion is avoided.

Since the two color switching devices 13 and 14 are connected in opposed relation, even if the deflection of the electron beam $b$ varies slightly as it passes through the color switching device 14 at the central portion thereof or at the marginal portion, this variation can be compensated for by the color switching coil assembly 13. Consequently, the electron beam $b$ can be impinged upon the phosphor screen 6 at a desired location, and problems of color distortion can be avoided.

The structure of the present invention also makes it possible to reduce the amount of power consumed in the color switching circuits. Referring to FIGURE 4, this figure illustrates schematically the manner in which an electron beam is deflected and impinged upon the phosphor screen 6 under various conditions. The straight line 20R indicates the path of the electron beam directed toward a red strip phosphor R when no color switching current is applied to the color switching devices 13 and 14. The line 20G indicates the path of the electron beam $b$ directed toward a green strip phosphor G after being deflected initially by the color switching device 13 and finally by the color switching device 14. The electron beam is initially deflected by angles $\theta_2$ and $\theta_3$, respectively, by the color switching devices 13 and 14. The angle $\theta_1$ is the incident angle of the beam necessary for color switching. It will be seen that $\theta_1$ represents the difference between $\theta_3$ and $\theta_2$. Accordingly, for proper color switching without causing color distortion, $\theta_3$ must be greater than zero, and $\theta_3$ must be greater than $\theta_2$.

The angles $\theta_2$ and $\theta_3$ can be made small by locating the color switching devices 13 and 14 at greater distances from the deflection yoke 12. However, since the color switching device 13 is located near the electron gun, its magnetic path may pass within the electron gun, and may distort the beam and thereby reduce the resolution. For a 12 inch color picture tube, it is convenient to locate the neck engaging color switching device 13 a distance of approximately 40 mm. from the deflection yoke 12, this distance being indicated by the legend $L_N$ in FIGURE 4.

In order to reduce the power consumed in the color switching device 14, it is necessary to decrease the angle $\theta_3$, so that the color switching device 14 should be positioned as close to the phosphor screen 6 as possible. Consequently, the positioning of the color switching devices depends on a compromise between the two contradictory conditions mentioned above.

Figure 5:
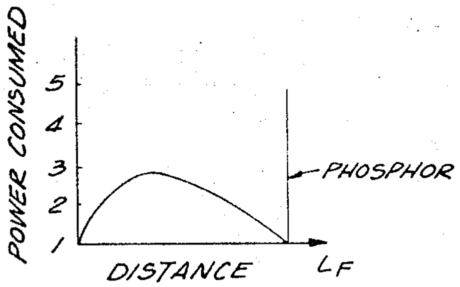
FIGURE 5 is a graph illustrating the relationship between the position of the color switching device on the conical portion of the tube and its power consumption.

FIGURE 5 is a graph illustrating the relative amount of power consumed with relation to the distance between the deflection center of the deflection yoke 12 and the phosphor screen. As seen from this graph, the power consumed may be low when the color switching device 14 is located near the deflection yoke, or near the phosphor screen. However, when the color switching device 14 is located near the phosphor screen, the diameter required in the device 14 is great, and its entire space field cannot be made uniform, resulting in color distortion. When the color switching device 14 is positioned in the vicinity of the deflection yoke 12, the beam extends substantially centrally of the coil, so that it passes through a relatively uniform magnetic field and color distortion is eliminated.

The following table lists the preferred values for the distances $L_1$ and $L_2$ for various sizes of color picture tubes.

| Size of picture tube | $L_1$ (mm.) | $L_2$ (mm.) | $L_1/L_2$ |
|---|---|---|---|
| 4-6 inch | 50-65 | 50-60 | 1.0-1.1 |
| 6-12 inch | 50-90 | 50-120 | 1.0-0.75 |
| 12-19 inch | 50-120 | 50-140 | 1.0-0.4 |

In a typical 12 inch color picture tube, the following distances and angles produce satisfactory results:

| | | |
|---|---|---|
| $L_1$ | mm | 95 |
| $L_2$ | mm | 120 |
| $L_3$ | mm | 15 |
| $\theta_1$ | | 1°9′ |
| $\theta_2$ | | 1°28′ |
| $\theta_3$ | | 2°37′ |

Figure 6:
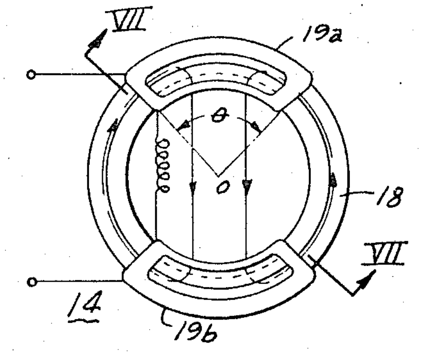
FIGURE 6 is a plan view of a modified form of color switching coil assembly which can be used on the conical portion of the tube.
Figure 7:
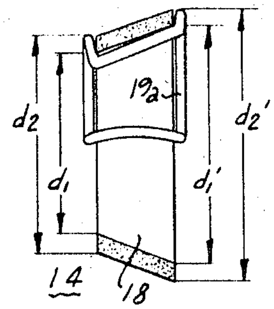
FIGURE 7 is a view in elevation, and partly in cross-section, of the assembly shown in FIGURE 6.

FIGURES 6 and 7 illustrate another physical embodiment of the color switching device 14 which is arranged to engage the conical portion of the tube. The device 14 consists of a core 18 of frusto-conical configuration conforming to the outer circumferential surface of the conical portion 4, and coils 19A and 19B are wound on the core 18 along the inner circumferential surfaces thereof symmetrically over a predetermined angular distance $\theta$ with the respect to the axis O. The angular extent of the segments, represented by the angle $\theta$ may range from 50 to 160 degrees, and the coils 19A and 19B may each be of about 5 turns. The current of 2 to 4 amperes can be applied to the coils 19A and 19B, thereby producing a magnetic field of 20 to 40 ampere-turns. The core 18 may have an inner diameter of about 108 mm. and an outer diameter of about 127 mm., the diameters being indicated at $d_1$ and $d_2$ in FIGURE 7. The inner and outer diameters at the enlarged end of the core, indicated at $d_1'$ and $d_2'$ in FIGURE 7 may be about 125 mm. and 140 mm., respectively.

Figure 8:
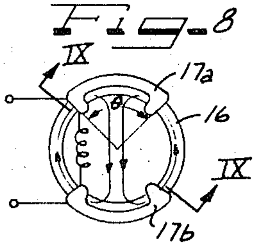
FIGURE 8 is a plan view of a still further modified form of a color switching coil assembly which can be used to engage the neck portion of the tube.
Figure 9:
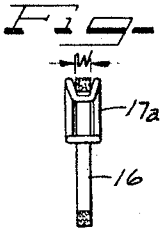
FIGURE 9 is a view in elevation and partly cross-section of the device shown in FIGURE 8, the section being taken along the line V—V of FIGURE 8.

FIGURES 8 and 9 illustrate a further form of the invention suitable for the neck engaging color switching assembly 13. This assembly includes a tubular core 16, containing coils 17A and 17B, and having a width representd by reference character W. The angle $\theta$ subtended by the ends of the coils may be about 50 to 160 degrees. It is desirable to use as small a width of core 16 as possible. This is because if the width is large, the magnetic field of the electron gun 11 within the neck portion 5 is adversely affected thereby deteriorating the focusing of the electron beam, and an adverse effect is produced by the metallic electrodes of the electron gun 11. Typically, the width of the core 16 is in the range from about 7 to 14 mm.

Figure 10:
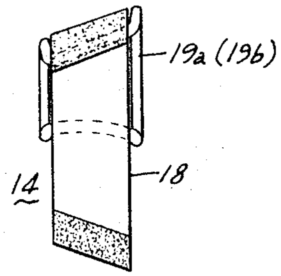
FIGURE 10 is a cross-sectional view of still another modified form of switching device which can be used in accordance with the present invention.

The coils 17A, 17B, 19A, and 19B illustrated in FIGURES 6 to 9 are wound on the cores 16 and 18 along the inner circumferential surfaces of the cores. In some cases, the coils may be embedded in the inner circumferential portions of the core, as illustrated in the embodiments of FIGURE 10.

In all cases, however, the distance $L_1$ between the neck engaging and conical engaging color switching devices 13 and 14, and the distance $L_2$ between the conical engaging switching device 14 and the post-acceleration grid 7 should be selected so that the ratio between the two should be between about 0.4 and 1.1.

Since the coils 17A, 17B, 19A, 19B are wound on their cores 16 and 18 in the manner of a saddle, the magnetic fluxes of the coils are interrupted by the cores 16 and

18 and almost all of the flux passes through the cores 16 and 18, with the result that leakage flux is minimized. Consequently, no adverse influence is exerted on the deflection yoke 12 by leakage flux, and no disturbance is caused in the magnetic fields through which the electron beam passes. Thus, the invention is particularly applicable when employed in a color picture tube using a high frequency signal of 3.58 mc. as the color switching signal in the dot-sequential system.

It should be evident that various modifications can be made to the described embodiments without departing from the scope of the present invention.

We claim as our invention:

1. A color picture tube circuit comprising a cathode ray tube having a single electron gun, a screen having color emitting phosphors thereon, an accelerating grid positioned in relatively close proximity to said screen, a deflection yoke disposed between said electron gun and said grid, first color switching coil disposed behind said deflection yoke and arranged to diverge the electrons leaving said gun, a second color switching coil disposed ahead of said deflection coil and arranged to converge the electrons passing through said deflection yoke, said first and second color switching coils being connected in series and in opposed phase relation, and means for applying a color switching signal across the serially connected switching coils.

2. A color picture tube circuit comprising a cathode ray tube having a single electron gun, a screen having color emitting phosphors thereon, an accelerating grid positioned in relatively close proximity to said screen, first and second color switching coils mounted along said tube, said coils being electrically connected in series and in opposed phase relation, and a deflection yoke disposed between said color switching coils, the ratio of the distance between said first and second color switching coils and the distance between the second color switching coil and the accelerating grid being in the range from about 0.4 to 1.1.

3. The circuit of claim 2 in which each of said color switching devices includes a circular yoke and a pair of oppositely wound coils on opposed sides of said yoke.

4. The circuit of claim 2 in which said first color switching device is disposed on the neck portion of said tube and said second color switching device is disposed on the conical portion of said tube.

References Cited

UNITED STATES PATENTS

| | | | |
|---|---|---|---|
| 2,672,575 | 3/1954 | Werenfels | 315—21 |
| 2,685,660 | 8/1954 | Norgaard. | |
| 2,741,720 | 4/1956 | Lafferty | 315—21 X |
| 2,959,483 | 11/1960 | Kaplan | 315—21 X |
| 3,247,426 | 4/1966 | Havn | 313—84 X |

RODNEY D. BENNETT, Jr., Primary Examiner

BRIAN L. RIBANDO, Assistant Examiner